(12) United States Patent
Shen

(10) Patent No.: US 11,636,051 B2
(45) Date of Patent: Apr. 25, 2023

(54) BUS ARBITRATION CIRCUIT AND DATA TRANSFER SYSTEM INCLUDING THE SAME

(71) Applicant: ABLIC Inc., Tokyo (JP)

(72) Inventor: Biao Shen, Tokyo (JP)

(73) Assignee: ABLIC Inc., Tokyo (JP)

( * ) Notice: Subject to any disclaimer, the term of this patent is extended or adjusted under 35 U.S.C. 154(b) by 0 days.

(21) Appl. No.: 17/524,729

(22) Filed: Nov. 11, 2021

(65) Prior Publication Data

US 2022/0164295 A1 May 26, 2022

(30) Foreign Application Priority Data

Nov. 24, 2020 (JP) .............................. JP2020-193969

(51) Int. Cl.
*G06F 13/16* (2006.01)
*G06F 13/362* (2006.01)

(52) U.S. Cl.
CPC ........ *G06F 13/1605* (2013.01); *G06F 13/362* (2013.01)

(58) Field of Classification Search
CPC . G06F 13/4282; G06F 13/1605; G06F 13/362
See application file for complete search history.

(56) References Cited

U.S. PATENT DOCUMENTS

| | | | | |
|---|---|---|---|---|
| 6,092,138 A | * | 7/2000 | Schutte | G06F 13/00 710/113 |
| 6,233,635 B1 | * | 5/2001 | Son | G06F 13/4291 710/315 |
| 10,983,942 B1 | * | 4/2021 | Ngo | H04L 69/08 |
| 2004/0255070 A1 | * | 12/2004 | Larson | G06F 13/4059 710/305 |

FOREIGN PATENT DOCUMENTS

JP 2002189697 7/2002

* cited by examiner

*Primary Examiner* — Brian T Misiura
(74) *Attorney, Agent, or Firm* — JCIPRNET

(57) ABSTRACT

A bus arbitration circuit includes a first bus port, a second bus port, a first output circuit connected to the first bus port, a second output circuit connected to the second bus port, a control circuit, and a switch circuit. The control circuit includes a first input port, a second input port, a control signal output port, and an output port. The first input port receives data of the first bus port, the second input port receives data of the second bus port, and data is outputted from the output port to an input port of the first output circuit. The switch circuit has an input port connected to the first bus port, a control port connected to the control signal output port of the control circuit, and an output port from which data of a host bus is outputted to an input port of the second output circuit.

7 Claims, 2 Drawing Sheets

BUS ARBITRATION CIRCUIT AND DATA TRANSFER SYSTEM INCLUDING THE SAME

CROSS-REFERENCE TO RELATED APPLICATION

This application claims the priority benefit of Japan application serial no. 2020-193969, filed on Nov. 24, 2020. The entirety of the above-mentioned patent application is hereby incorporated by reference herein and made a part of this specification.

BACKGROUND

Technical Field

The present invention relates to a bus arbitration circuit and a data transfer system including the same.

Description of Related Art

As a data transfer system, a system which transfers data between a master IC and a plurality of slave ICs via such a serial bus as I2C bus is known. FIG. 3 is a block diagram illustrating a data transfer system conforming to the I2C protocol. In a data transfer system 200, a master IC 230 and a plurality of slave ICs 231 to 237 are connected by two bus lines including a serial data line 210 and a clock line 220, and conforming to the I2C protocol, data transfer is performed using these bus lines (see, for example, Patent Document 1: Japanese Patent Application Laid-Open No. 2002-189697). However, as the data transfer system conforming to the I2C protocol has been developed as a single layer system with a simple configuration, a multi-layer system including a host bus and a local bus has not been assumed.

The multi-layer system includes a bus arbitration circuit between the host bus and the local bus. The bus arbitration circuit generally includes a transmission gate which is a bidirectional switch circuit for connecting the host bus and the local bus. However, since the transmission gate is in a closed state at the time of arbitration, the slave ICs connected to each local bus are directly connected to the host bus via the transmission gate. Therefore, there is a problem that the data transmission speed of the bus decreases as the number of slave ICs connected to local bus increases.

SUMMARY

In accordance with an embodiment of the present invention, a bus arbitration circuit includes a first bus port, a second bus port, a first output circuit, a second output circuit, a control circuit, and a switch circuit. The first bus port is connected to a host bus. The second bus port is connected to a local bus. The first output circuit has an output port connected to the first bus port. The second output circuit has an output port connected to the second bus port. The control circuit includes a first input port, a second input port, a control signal output port, and an output port. The first input port receives data of the first bus port, the second input port receives data of the second bus port, and data is outputted from the output port of the control circuit to an input port of the first output circuit. The switch circuit has an input port connected to the first bus port, a control port connected to the control signal output port of the control circuit, and an output port from which data of the host bus is outputted to an input port of the second output circuit.

According to the present invention, by using a switch circuit and an output circuit to transfer data from the host bus to the local bus, and by using another output circuit to transfer data from the local bus to the host bus, it is possible to provide a bus arbitration circuit by which the slave ICs on the local bus are not directly connected to the host bus so the data transmission speed does not decrease.

DESCRIPTION OF THE EMBODIMENTS

Hereinafter, an embodiment of the present invention will be described with reference to the drawings.

Figure 2:
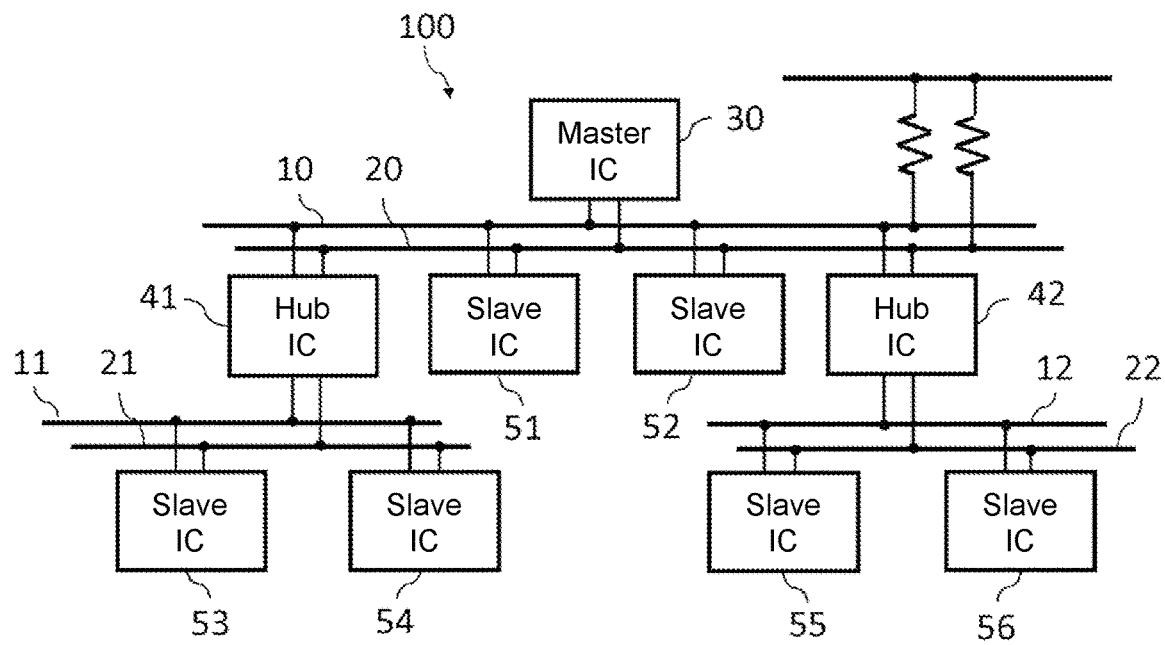
FIG. 2 is a block diagram illustrating a multi-layer data transfer system including the bus arbitration circuit of the present embodiment.
Figure 3:
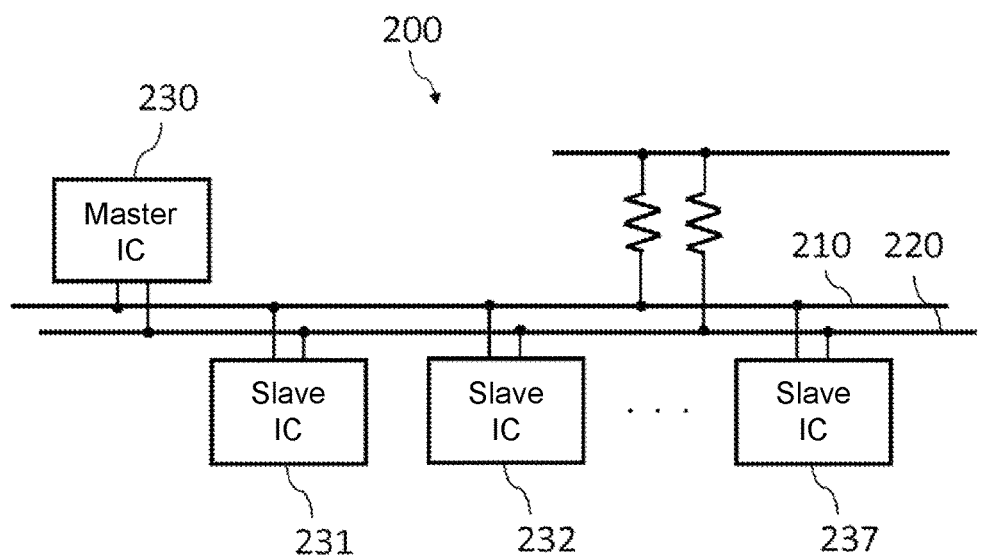
FIG. 3 is a block diagram illustrating a data transfer system conforming to the I2C protocol.

FIG. 2 is a block diagram illustrating a multi-layer data transfer system 100 including a bus arbitration circuit of the present embodiment. The data transfer system 100 includes a serial data line 10 and a clock line 20 which are a host bus, a serial data line 11 and a clock line 21 which are a first local bus, a serial data line 12 and a clock line 22 which are a second local bus, a master IC 30, hub ICs 41 to 42 which are bus arbitration circuits, and slave ICs 51 to 56. Although the bus lines are connected to a power supply line by pull-up resistors, in the figure, pull-up resistors are illustrated only for the serial data line 10 and the clock line 20, and the others are omitted.

The master IC 30 is connected to the host bus. The slave ICs 51 to 52 are connected to the host bus. The hub IC 41 is connected between the host bus and the first local bus. The hub IC 42 is connected between the host bus and the second local bus. The slave ICs 53 to 54 are connected to the first local bus. The slave ICs 55 to 56 are connected to the second local bus.

Figure 1:
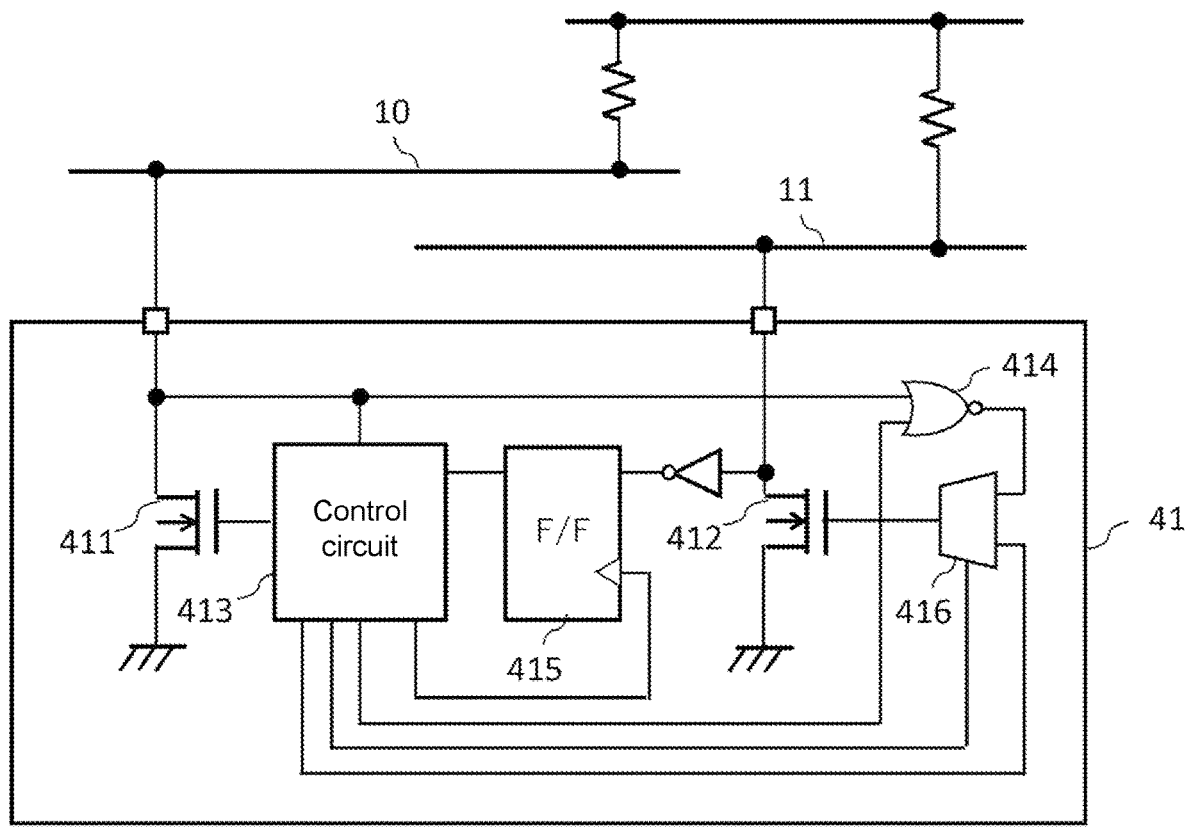
FIG. 1 is a circuit diagram illustrating a bus arbitration circuit of the present embodiment.

FIG. 1 is a circuit diagram illustrating a bus arbitration circuit of the present embodiment. Hereinafter, the hub IC 41 which is a bus arbitration circuit will be described; for simplicity, only the serial data lines are illustrated for the host bus and the local bus. The clock lines are connected in the same manner as the serial data lines. The hub IC 42 has the same configuration as the hub IC 41.

The hub IC 41 includes a first bus port connected to the serial data line 10 which is connected to the power supply line by a pull-up resistor, a second bus port connected to the serial data line 11 which is connected to the power supply line by a pull-up resistor, an NMOS transistor 411 which is a first output circuit connected to the first bus port, an NMOS transistor 412 which is a second output circuit connected to the second bus port, a control circuit 413, a switch circuit 414, a flip-flop circuit (F/F) 415, and a multiplexer 416. In the present embodiment, the switch circuit 414 is composed of a NOR circuit. The control circuit 413 includes an output port, a first input port, a second input port, a clock output port, a first control signal output port, a second control signal output port, and a data output port. Although the serial data line 10 and the serial data line 11 are connected to the same power supply line, they may also be connected to different power supply lines.

The NMOS transistor 411 has a drain connected to the first bus port, a gate connected to the output port of the control circuit 413, and a source connected to a ground port. The NMOS transistor 412 has a drain connected to the second bus port, a gate connected to an output port of the multiplexer 416, and a source connected to a ground port. In the control circuit 413, the first input port is connected to the first bus port, the second input port is connected to an output port of the flip-flop circuit 415, the clock output port is connected to a clock port of the flip-flop circuit 415, the first control signal output port is connected to a control port of the switch circuit 414, the second control signal output port is connected to a control port of the multiplexer 416, and the data output port is connected to a first input port of the multiplexer 416. The switch circuit 414 has an input port connected to the first bus port, and an output port connected to a second input port of the multiplexer 416. The flip-flop circuit 415 has an input port connected to the second bus port via a NOT circuit. Since the output circuits are composed of NMOS transistors, a NOT circuit is provided at the second bus port for the purpose of matching logics, but logics may also be matched anywhere such as the control circuit.

The hub IC 41 of the present embodiment constitutes an open-drain output circuit for the serial data lines 10 and 11. Other hub ICs and slave ICs also constitute similar output circuits. This is a configuration required at the time of arbitration and other configuration such as a CMOS output circuit is also possible at the times of non-arbitration, which is omitted in the figure. Further, the multiplexer 416 is controlled to output the signal of the switch circuit 414 to the NMOS transistor 412 at the time of arbitration or to output the signal of the data output port of the control circuit 413 to the NMOS transistor 412 at the times of non-arbitration. Therefore, in the following description of arbitration, the multiplexer 416 will be described as controlled to output the signal of the switch circuit 414 to the NMOS transistor 412.

The master IC 30 outputs a start condition signal to the serial data line 10 to inquire each IC whether there is a request. Upon receiving the start condition signal, the slave ICs 51 to 52 output their own address signals synchronizing with the clock signal if there is a request in them.

Upon receiving the start condition signal, the hub ICs 41 to 42 output the start condition signal to their local bus. Then, the hub ICs 41 to 42 output to the host bus an address signal synthesizing the address signal of their local bus and their own address signals if there is a request in any of them. At that time, they fulfill the connection between the host bus and each local bus so that arbitration is carried out stably.

Upon receiving the start condition signal, the slave ICs 53 to 56 output their own address signals synchronizing with the clock signal if there is a request.

Next, the arbitration operation of the multi-layer data transfer system including the bus arbitration circuit of the present embodiment will be described with reference to FIG. 1 and FIG. 2. Although the operation for the hub IC 41 will be described, the hub IC 42 shall also operate in the same manner.

The master IC 30 outputs a start condition signal to the serial data line 10 to inquire each IC whether there is a request. The hub ICs 41 to 42 and the slave ICs 51 to 52 connected to the host bus receive the start condition signal. The start condition signal is, for example, when the serial data line 10 falls from the Hi level to the Lo level with the clock signal maintaining the Hi level.

The hub IC 41 receives the start condition signal from the first bus port. The first input port of the control circuit 413 and the input port of the switch circuit 414 receive the start condition signal. In a standby state, the switch circuit 414 is set to a closed state by the control signal of the control circuit 413. In FIG. 1, since the switch circuit 414 is composed of a NOR circuit, the control circuit 413 outputs the Lo level to the control signal output port. Therefore, via the switch circuit 414 and the NMOS transistor 412, the start condition signal received by the first bus port from the serial data line 10 is outputted from the second bus port to the serial data line 11.

In other words, the slave ICs 53 to 54 connected to the serial data line 11 which is a local bus also receive the start condition signal from the master IC 30. Therefore, having received the start condition signal from the master IC 30, the slave ICs 51 to 56 are able to be inquired whether there is a request in them.

Next, when the clock signal falls, the hub ICs and slave ICs which have a request output their own address data to the serial data lines synchronizing with the received clock signal. At this time, the hub IC synthesizes the address data of the local bus and its own address data and outputs the data to the host bus.

The operation of the hub IC 41 at this time will be described in detail.

The control circuit 413 outputs the Hi level to the first control signal output port in synchronization with the fall of the clock signal to set the switch circuit 414 to an open state. By setting the switch circuit 414 to the open state, the address data of the serial data line 10 is not transmitted to the serial data line 11. With this control, arbitration can be performed only within the serial data line 11, i.e., the local bus.

The control circuit 413 outputs the clock signal to the clock output port after a first predetermined time has elapsed from the fall of the clock signal. Here, the first predetermined time is a time until the address data of the serial data line 11 stabilizes. Upon receiving the clock signal at the clock port, the flip-flop circuit 415 latches the signal according to an arbitration result of the local bus and outputs to the output port. Upon receiving the arbitration result of the local bus from the flip-flop circuit 415 at the second input port, if there is a request to the hub IC 41, the control circuit 413 synthesizes the local bus arbitration result with its own address data and outputs the address data to the gate of the NMOS transistor 411.

Therefore, since the address data of the serial data line 11 is transmitted to the serial data line 10, arbitration is performed on the host bus based on the address data of all the hub ICs and slave ICs connected to the host bus and the local bus.

After a second predetermined time has elapsed from the fall of the clock signal, the control circuit 413 outputs the Lo level to the control signal output port to control the switch circuit 414 to the closed state. When the switch circuit 414 is in the closed state, the address data of the serial data line 10 is transmitted to the serial data line 11, and namely, the arbitration result of all the hub ICs and slave ICs is transmitted to the slave ICs 53 and 54. Here, the second predetermined time is a time until the flip-flop circuit 415 finishes latching and holding the signal according to the arbitration result of the local bus.

The arbitration based on the address data will be described assuming that the hub IC or slave IC with the smallest address data has the highest priority of request. In other words, the hub ICs and/or the slave ICs who output their address data this time as 0 (Lo level) can output the address data also at the fall of the next clock signal. If the serial data line is at the Lo level, the hub ICs and/or the slave ICs who output their address data this time as 1 (Hi level) cannot output the address data at the fall of the clock signal from the next time onward. In other words, these ICs do not participate in the arbitration thereafter.

The master IC 30 gives one clock for each address bit to repeat the above arbitration on the serial data line 10. Then, the master IC 30 accepts the request from the IC who won the arbitration.

As described above, since the bus arbitration circuit of the present embodiment uses a switch circuit and an output circuit for the output from the host bus to the local bus, and uses an output circuit for the output from the local bus to the host bus, the slave ICs of the local bus are not directly connected to the host bus. Therefore, even if the number of slave ICs connected to the local bus increases, the data transmission speed does not decrease as a result.

Although the embodiment of the present invention has been described above, the present invention is not limited to the above embodiment, and various modifications may be made without departing from the spirit of the present invention.

For example, the flip-flop circuit 415 is provided between the second input port of the control circuit 413 and the second bus port, but it is not limited thereto and may be any circuit which latches a signal. Further, if the control circuit 413 is configured to control to validate the data of the second input port after the first predetermined time, it is also possible not to provide the flip-flop circuit 415. Further, for example, the switch circuit 414 is composed of a NOR circuit, but is not limited thereto as long as it is configured according to the input logic and the output logic. Further, for example, although the arbitration has been described to start when the master IC transmits a start condition signal, a signal outputted by a hub IC or a slave IC or another signal may also be used.

What is claimed is:

1. A bus arbitration circuit comprising:
    a first bus port connected to a host bus;
    a second bus port connected to a local bus;
    a first output circuit having an output port connected to the first bus port;
    a second output circuit having an output port connected to the second bus port;
    a control circuit comprising a first input port, a second input port, a control signal output port, and an output port, wherein the first input port receives data of the first bus port, the second input port receives data of the second bus port, and data is outputted from the output port of the control circuit to an input port of the first output circuit; and
    a switch circuit having an input port connected to the first bus port, a control port connected to the control signal output port of the control circuit, and an output port from which data of the host bus is outputted to an input port of the second output circuit,
    wherein the switch circuit is set to a closed state by a control signal of the control circuit in a standby state, and outputs a start condition signal received at the input port,
    wherein the control circuit sets the switch circuit to an open state by the control signal after a predetermined time elapses, in response to the start condition signal being received at the first input port in the standby state.

2. The bus arbitration circuit according to claim 1, comprising:
    a flip-flop circuit provided between the second input port of the control circuit and the second bus port,
    wherein the flip-flop circuit has an input port receiving data of the second bus port, a clock port receiving a clock signal from the control circuit, and an output port connected to the second input port of the control circuit.

3. The bus arbitration circuit according to claim 1, wherein the first output circuit and the second output circuit are composed of NMOS transistors.

4. The bus arbitration circuit according to claim 2, wherein the first output circuit and the second output circuit are composed of NMOS transistors.

5. A data transfer system comprising:
    a master IC and a slave IC connected to a host bus;
    the bus arbitration circuit according to claim 1 connected to the host bus;
    a local bus connected to the bus arbitration circuit; and
    a slave IC connected to the local bus.

6. A data transfer system comprising:
    a master IC and a slave IC connected to a host bus;
    the bus arbitration circuit according to claim 2 connected to the host bus;
    a local bus connected to the bus arbitration circuit; and
    a slave IC connected to the local bus.

7. A data transfer system comprising:
    a master IC and a slave IC connected to a host bus;
    the bus arbitration circuit according to claim 3 connected to the host bus;
    a local bus connected to the bus arbitration circuit; and
    a slave IC connected to the local bus.

* * * * *